Figure 1:
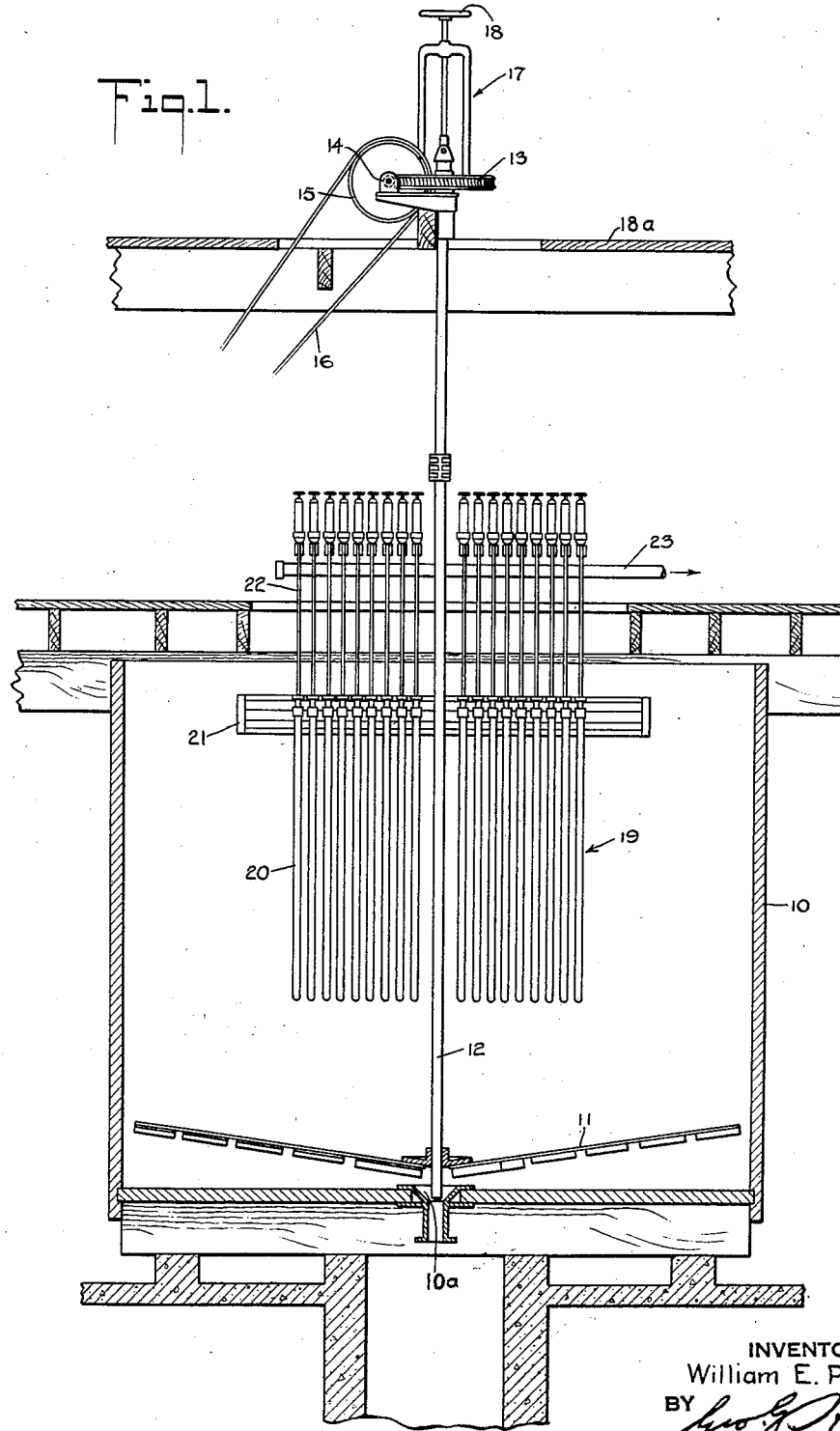

Aug. 9, 1932.　　　W. E. PIPER　　　1,870,381
FILTER BLOWBACK
Filed Sept. 21, 1929　　2 Sheets-Sheet 1

INVENTOR
William E. Piper
BY
ATTORNEY

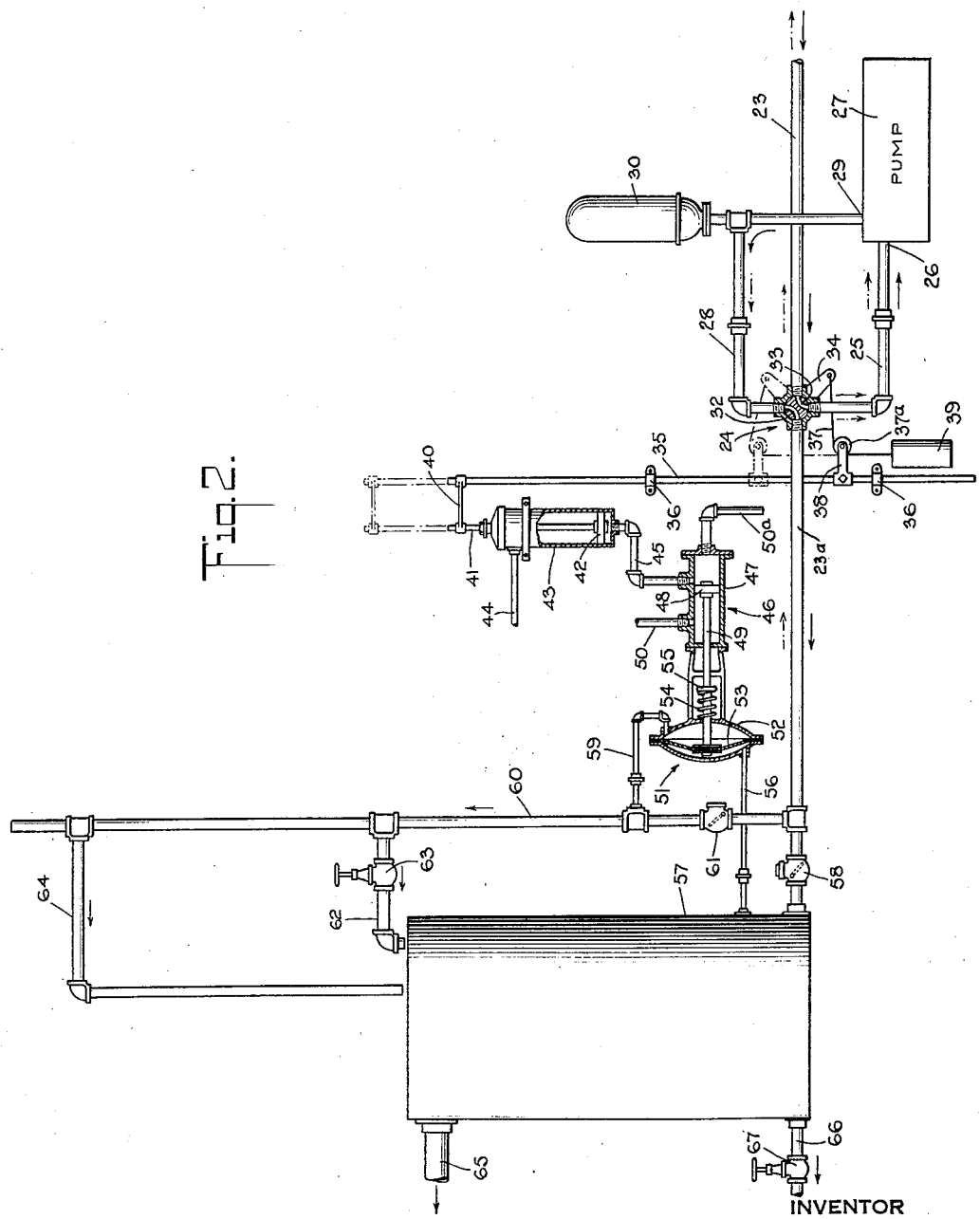

Patented Aug. 9, 1932

1,870,381

UNITED STATES PATENT OFFICE

WILLIAM E. PIPER, OF NEW CANAAN, CONNECTICUT, ASSIGNOR, BY MESNE ASSIGNMENTS, TO THE DORR COMPANY, INC., OF NEW YORK, N. Y., A CORPORATION OF DELAWARE

FILTER BLOWBACK

Application filed September 21, 1929. Serial No. 394,285.

This invention relates to improvements in the construction and operation of filters of the type in which a layer of solid material is accumulated on the surface of the filtering material and is periodically removed therefrom by a reverse flow of fluid, and more particularly to an arrangement for automatically arresting filtration and starting such reverse flow in accordance with the accumulation of solids on the filter surface.

In the operation of filters it is recognized that as the solids accumulate on the filter surface, and the rate of flow of filtrate through such solids and the underlying filtering material decreases progressively in proportion to the thickness of the accumulated solids, there is a certain point where further filtration is uneconomic, and it is necessary to remove some or all of the accumulated solids before continuing with filtration. As filtration, in types of filters to which this invention relates, must be interrupted for the cleaning operation, it is uneconomic to clean the filter too frequently, as the filtration rate will be reduced by the relatively shorter net filtering time; while it is likewise uneconomic to clean the filter at relatively infrequent intervals, since the very sharply reduced rate of flow of filtrate toward the end of each filtering period will likewise cut down the total amount of filtrate removed in any set period. Accurate determination of the proper period of operation between cleaning steps is therefore very important in obtaining the maximum total filtration.

In many instances, however, variations in the rate of feed and in the filtering characteristics of the solids in the feed vary from time to time the length of the filtration period between cleanings which will result in most efficient operation; and any arrangement whereby the cleaning step is accomplished at fixed intervals will result in reduced efficiency under such conditions.

The general object of this invention is to provide an arrangement and method of operation whereby the cleaning operation, such as a return flow of fluid through the filtering medium, will be carried out only at the time when the critical point indicated has been reached, regardless of variations in the rate of accumulation or characteristics of the solids on the filtering surface. The invention is particularly adapted for filters of the type in which cleaning is accomplished by a brief periodical reversal of the direction of flow of the filtrate, the back flow through the filter surface removing the accumulated solids. In the example of this type of filter illustrated herein, the accumulated solids thus removed settle to the bottom of a tank containing the filter elements and pulp to be filtered, with means for removing the settled solids in any usual manner.

A further object of this invention is to provide an arrangement of this type in which the apparatus which controls the reversal of flow is actuated by a simple automatic fluid pressure arrangement, such as one on which the pressure of a fixed body of accumulated filtrate is balanced against the varying pressure of a column of filtrate flowing from the filter and varying in height in accordance with the rate of flow, mechanism being provided for operating the cleaning apparatus when the difference in pressure between the fixed body of filtrate and the column drops below a predetermined amount. A further object is to provide means for adjusting readily the cleaning apparatus to suit varying conditions.

Other objects and advantages will be apparent from the following description taken in connection with the accompanying drawings in which Fig. 1 is a central vertical section of a filter thickener to which the present invention may be applied; and Fig. 2 is a view in elevation of one embodiment of the controlling means, parts being broken away.

In the preferred embodiment illustrated the invention is applied to a filter thickener of the type in which a plurality of filter elements are submerged in the pulp to be filtered, and are connected to a suitable source of suction, through which the liquid filtrate is withdrawn, while the solids accumulate as a layer or cake on the filtering surfaces of the various elements. A periodic reversal of flow of the filtrate discharges the cake from the surfaces of the elements; and as the cake is denser than the surrounding pulp, it will settle in fragments to the bottom of the tank, leaving the filtering surfaces free to accumulate additional layers of cake. The filtrate is removed by means of a pump in the suction line which discharges it into a filtrate receiver from which it overflows, the receiver being arranged to provide a relatively fixed back pressure. Between the pump and the receiver is located a vertical passage for the filtrate, extending substantially above the level of the filtrate in the receiver and provided with two discharge lines into the receiver, one slightly above the level of liquid therein, and the other at a substantially higher level.

The point during filtration at which the back flow to clean the filter should be started is indicated by the reduction in the rate of filtrate removal to a predetermined minimum flow. The lower of the two discharge lines into the filtrate receiver above described is adjusted so that it will just accommodate such minimum flow. Consequently when the rate of flow of filtrate is above the minimum, the amount in excess thereof will be forced up the vertical passage to the upper discharge line and will pass therethrough into the receiver. With this arrangement the back pressure from the vertical column in the passage will be determined by the height of the upper discharge line unless and until the flow of filtrate drops to the minimum rate accommodated by the lower passage. When this occurs all of the filtrate will pass into the receiver through the lower discharge line and the back pressure in the vertical column will be reduced to that equivalent to the height of the lower line.

A suitable arrangement is provided for reversing the flow of filtrate, actuated by changes in the back pressure due to variations in the rate of filtrate flow. In the arrangement preferred this is accomplished through a diaphragm, one side of which is subjected to pressure from the lower part of the filtrate receiver, the other side being under pressure from the vertical column. The diaphragm is controlled, as by means of a spring or the like, so that when the level in the vertical filtrate column drops to the lower line into the receiver, the diaphragm will be shifted by the receiver pressure combined with the spring pressure, actuating suitable mechanism for reversing the flow of filtrate, so that the filtrate will pass back through the filter leaves, preferably by back flow from the filtrate receiver, until the drop in level in the receiver reduces the pressure on the connected side of the diaphragm to a point where the diaphragm will swing back against the spring pressure into normal operating position. This diaphragm movement in the preferred form is employed to operate a valve in the pump line so arranged that in normal position the filter is connected through the pump to the vertical column discharging into the receiver, while upon reversal of operation the valve is thrown to connect the pump with the receiver and the discharge line from the pump with the filter. With this arrangement the pump may be maintained in continuous operation regardless of reversals in the direction of filtrate flow, especially as a quick-action-valve-shifting device may be used.

In the preferred form shown in the drawings the invention is applied to a machine of the filter thickener type, including a tank 10 provided with a central underflow outlet 10a. Rake arms 11 for impelling settled solids to the outlet 10a are mounted on shaft 12 rotated by worm gear 13 driven by worm 14 on the shaft of pulley 15 actuated by belt 16 connected to a source of power not shown. An arrangement for lifting the shaft 12 and rake arms 11 including a frame 17 and hand wheel 18, may be provided, the support and drive being carried by a suitable superstructure 18a, all in accordance with well known practice.

The leaf filter 19, composed of a plurality of filter leaves 20 supported on frame 21, is mounted in the tank 10 with the leaves 20 extending into the pulp, each leaf being connected through a line 22 with a discharge header on conduit 23, all in accordance with well known and standard arrangements.

As shown in Fig. 2, the header 23 is connected to means for automatically reversing the flow of filtrate. In the preferred form this includes a multiple valve 24 adapted to reverse the pump connections. When in normal operating position passage 33 through the valve connects header 23 with the inlet line 25 passing into the inlet 26 of pump 27, whose outlet 29 is connected through an outlet line 28, preferably having the usual air dome 30, with a separate passage 32 in the valve, communicating under normal conditions with the line 23a to the filtrate receiver system. Passages 32 and 33 in the valve are so arranged that by a quarter turn of the valve plug by means of handle 34 from the normal operating position shown in full lines in the drawings to the reverse position shown in dotted lines, the pump suction 25 will be connected to the receiver system through passage 32 and the pump outlet line 28 will be connected to the header 23 through passage 33. The means for effecting this valve movement to reverse the flow of filtrate, as shown in the preferred form illustrated, may include a vertical shift rod 35 mounted in guides 36, and a flexible cable 37 connected to the end of valve handle 34 and running over pulley 37a on bracket 38 mounted on the shift rod 35, the lower end of the cable 37 carrying a weight 39.

The upper end of the shift rod 35 is connected by cross arm 40 with the shifter piston rod 41 carrying at its lower end a piston 42 slidably fitted in cylinder 43. A pressure line 44 is connected to any suitable source of fixed fluid pressure, not shown, adapted to exert fluid pressure on the upper face of the piston 42. Pressure line 45, connected to the cylinder 43 below the piston 42, communicates with a valve 46 which may be of the piston type, including a cylinder 47 in which piston 48 is shifted by means of rod 49 to connect the line 45 either with line 50 connected to a suitable source of fluid pressure which may be the same as that connected to line 44, or with a relief line 50a.

Valve 46 is actuated by a suitable pressure-sensitive device 51. In the arrangement shown this comprises a casing 52 in which is mounted a diaphragm 53 dividing the casing into two closed compartments. The diaphragm 53 is mounted on the end of piston rod 49, which is normally impelled to the right in the form illustrated by means of spring 54, bearing against the casing 52 and a collar 55 which may be threaded on the piston rod 49. At the left side of the diaphragm the casing 52 is connected by means of a line 56 with the lower end of the receiver tank 57, which likewise is connected at its lower end with line 23a through check valve 58. At the other side of the diaphragm the casing 52 is connected by a line 59 to a riser 60 extending vertically from the line 23a between check valve 58 and valve 24.

The riser 60, which is provided with a check valve between its connections with line 59 and line 23a, is provided with a lower discharge line 62 located preferably a short distance above the maximum level of the liquid in receiver tank 57 and having a valve 63 for controlling the rate of flow through said line 62. At a substantially higher point the riser 60 is connected with a second discharge line 64 likewise running to the receiver tank 57. An overflow line 65 at the top of receiver 57 serves for the normal discharge of filtrate therefrom; and a suitable drainage outlet 66 controlled by valve 67 may be provided at the bottom of the receiver tank 57.

In operation pump 27 is started and draws filtrate through the filter elements 20, lines 22, header 23, valve passage 33 and inlet line 25 into the pump, discharging such filtrate through line 28, valve passage 32 and line 23a into the riser 60, check valve 58 preventing discharge directly into tank 57. A portion of the filtrate will flow through pipe line 62 into tank 57; but as valve 63 is set to pass only a minimum flow, substantially below the initial rate of filtrate flow, the excess of filtrate will be forced up the riser 60 above line 62 and will discharge into receiver tank 57 through line 64. The filtrate will overflow from tank 57 through pipe 65 as soon as the tank is full.

As operation of the system continues solids will build up in the form of a cake on the filtering surfaces of filter elements 20, progressively reducing the rate at which filtrate can be withdrawn. When the reduced rate of filtrate flow has reached a point where line 62 as controlled by valve 63 will accommodate all of the flow, discharge through line 64 will cease, and with a slight additional decrease in rate of flow the level of the filtrate in riser 60 will drop to the level of pipe 62.

The pressure at the left of diaphragm 53 is substantially fixed during normal operation, being established by the level of filtrate in tank 57 at the overflow 65, and applied to the diaphragm through line 56. To this pressure is added the force of spring 54. The pressure at the right of diaphragm 53 corresponds to the head of the liquid in riser 60 as applied through line 59. The pressure on diaphragm 53 from the left is normally calibrated, as by means of proper design and adjustment of spring 54, so that it will be less than the pressure on the diaphragm exerted by the filtrate in the riser 60 when the latter extends upwardly to discharge line 64, but will be greater than such pressure when the level in said riser drops to the discharge line 62. Consequently, when the decrease in the rate of filtration causes the liquid level in riser 60 to drop to line 62, the pressure at the left of diaphragm 53 will shift it toward the right, moving piston 47 beyond the inlet of line 45 and thus connecting pressure line 50 with the latter. As the pressure from line 44 on the top of shifter piston 42 is less than the pressure on the bottom of said piston 42 because of the reduction in area caused by the piston rod 41, said piston 42 will be forced upwardly, raising shift rod 35 through rod 41 and cross bar 40 to the upper position shown in dotted lines. The consequent elevation of bracket 38 and pulley 37a will shift the cable 37 to a position above the center line of valve handle 34, so that the weight 39 will move the handle into the upper dotted line position, changing the position of the valve passages so that passage 32 will connect line 23a with the pump suction line 25 and passage 33 will connect the pump discharge line 28 with header 23 connected to the filter elements. As this method of moving the valve acts very rapidly, the pump may continue in operation during the valve movement.

With the valve in back flow position the pump will draw filtrate from the receiver tank 57 through check valve 58, while check valve 61 will maintain the liquid level in header 60 at approximately the height of line 62, thereby maintaining a fixed pressure at the right of diaphragm 53. The filtrate withdrawn from the tank 57 will be pumped back through filter elements 20, serving to flush off the accumulated solids and clean the filtering medium. This backflow will continue until the fall in liquid level in tank 57 reduces the pressure through line 56 to a point where the pressure through line 59 will be adequate to shift the diaphragm 53 again into position at the left as shown in the drawings. This return movement will return piston 48 to a point where line 45 is cut off from connection with pressure line 50 and is connected to the relief line 50a. The liquid pressure through line 44 will then force piston 42 downwardly, lowering shift rod 35 and moving bracket 38 and pulley 37a to lower position, in which the cable 37 will be below the center line of valve handle 34 and will serve to move it abruptly into lower position as shown in full lines. Thereupon normal action of the system will be resumed and it will operate as described above, the liquid level in tank 57 rising until it reaches the permanent overflow level while the level in riser 60 will reach that of discharge line 64 before the level in tank 57 rises appreciably, thereby assuring maintenance of the device 51 in normal operating position until the filtrate flow again reaches the predetermined critical minimum.

It will be evident that by proper adjustment of valve 63 the point at which backflow is established can be readily regulated; and by adjustment of the pressure of spring 54, as by shifting the position of collar 55, the amount of filtrate returned as backflow can likewise be readily controlled.

While the preferred arrangement of pipe connections, control valve, valve connections, pressure-sensitive device and valve actuating means connected thereto have been shown, it will be apparent that many changes in these and other features can readily be made without departing from the true spirit and scope of the invention as set forth in the claims.

I claim:

1. A filter apparatus comprising a pulp container, a filter element in said container, a receptacle, mechanism including a pump and conduits connecting said pump with the filter element and with said receptacle, said conduits comprising a section provided with a plurality of vertically spaced means for discharging liquid into said receptacle, a multiple way valve in said conduits adapted in one position to establish communication through said conduits between the inlet of said pump and the filter element and the outlet side of said pump and the said section of said conduit and in another position to establish communication between the inlet of said pump and the receptacle and the outlet side of said pump and the filter element, and means for moving said valve from one of said positions to the other of said positions comprising a casing, a movable member dividing the interior of the casing into two chambers, a conduit connecting one of said chambers to said receptacle and a conduit connecting the other of said chambers with the said section of the first mentioned conduit, whereby when the difference between the levels of the liquid in said receptacle and in the said section of the first mentioned conduit is less than a predetermined amount due to reduced flow through said filter element, said valve is positioned to establish communication between the outlet side of said pump and the filter element and between the inlet side of said pump and the receptacle and when the levels of the liquid in the said section of the first mentioned conduit and in said receptacle is greater than a predetermined amount said valve is positioned to establish communication between the inlet of said pump and the filter element and between the outlet of said pump and the said section of the first mentioned conduit.

2. A filter apparatus comprising a pulp container, a filter element in said container, a receptacle, mechanism including a pump and conduits connecting said pump with the filter element and with said receptacle, said conduits comprising a vertical section provided with a plurality of vertically spaced means for discharging liquid into said receptacle, a multiple way valve in said conduits adapted in one position to establish communication through said conduit between the inlet of said pump and the filter element and the outlet side of said pump and the said vertical section of said conduit and in another position to establish communication between the inlet of said pump and the receptacle and the outlet of said pump and the filter element, and means for moving said valve from one of said positions to the other of said positions comprising a casing, a movable member dividing the interior of the casing into two chambers, a conduit connecting one of said chambers to said receptacle and a conduit connecting the other of said chambers with the vertical section of said first mentioned conduit.

3. In filter apparatus, the combination with a filter having a filter medium, a conduit connected with said filter at one side of said filter medium to enable suction or pressure to be produced at such side of the filter medium, a pump having an inlet and an outlet, and a controlling valve in said conduit for connecting said inlet with said conduit at the filter side thereof and said outlet with said conduit at the other side of the valve and vice versa; of means for reversing said controlling valve including a pressure-sensitive device operable in one direction when the rate of filtrate withdrawal falls to a predetermined minimum and in the other direction upon back flow to the filter, and means including a rapid action device for connecting said pressure-sensitive device with said valve to operate the same.

4. In filter apparatus, the combination with a filter having a filter medium, a conduit connected with said filter at one side of said filter medium to enable suction or pressure to be produced at such side of the filter medium, a pump having an inlet and an outlet, and a controlling valve in said conduit for connecting said inlet with said conduit at the filter side thereof and said outlet with said conduit at the other side of the valve and vice versa; of means for reversing said controlling valve including a pressure-sensitive device operable in one direction when the rate of filtrate withdrawal falls to a predetermined minimum and in the other direction upon back flow to the filter, a connection between the pressure-sensitive device and said controlling valve for operating the latter, and means for controlling said pressure-sensitive device including a receiver tank connected at its lower part with said conduit at the side farthest from the filter, a check valve to prevent direct flow from said conduit into said receiver tank, a riser connected with said conduit at the filter side of said check valve, a lower drainage line connected with said riser and emptying into said tank, a valve in said lower drainage pipe for adjustment to determine the minimum rate of filtrate withdrawal for which all of the filtrate will flow through the lower drainage line, a second drainage line connected with said riser above the first mentioned line and discharging into said receiver tank, a connection between said riser above the check valve therein and the pressure-sensitive device and a connection between the lower part of the receiver tank and the pressure-sensitive device.

In testimony whereof I affix my signature.

WILLIAM E. PIPER.